United States Patent [19]

Yamaguchi et al.

[11] Patent Number: 4,872,075
[45] Date of Patent: Oct. 3, 1989

[54] TAPE LOADING MECHANISM IN MAGNETIC RECORDING AND REPRODUCING APPARATUS

[75] Inventors: Katsumi Yamaguchi; Kikuo Yoshikawa; Shigeo Kinoshita; Takao Kanai; Syouichiro Yokoi, all of Tokyo, Japan

[73] Assignee: Clarion Co., Ltd., Tokyo, Japan

[21] Appl. No.: 325,066

[22] Filed: Mar. 14, 1989

Related U.S. Application Data

[63] Continuation of Ser. No. 58,458, Jun. 5, 1987, abandoned.

[30] Foreign Application Priority Data

Jun. 13, 1986 [JP] Japan .................. 61-136106
Jun. 13, 1986 [JP] Japan .................. 61-136107

[51] Int. Cl.$^4$ .................................... G11B 5/027
[52] U.S. Cl. ........................... 360/85; 360/95
[58] Field of Search .......................... 360/84–85, 360/95

[56] References Cited

U.S. PATENT DOCUMENTS

| 4,045,820 | 8/1977 | Staar | 360/85 |
| 4,566,047 | 1/1986 | Hirose | 360/85 |
| 4,685,008 | 8/1987 | Ohyama | 360/85 |

*Primary Examiner*—A. J. Heinz
*Attorney, Agent, or Firm*—Flynn, Thiel, Boutell & Tanis

[57] ABSTRACT

A tape loading mechanism for use in a magnetic recording and reproducing apparatus including a rotary head comprises: a transmission gear assembly engaging a drive gear rotated by a loading motor; loading gears located at opposite sides of the rotary head one of which is directly connected to the transmission gear assembly whereas the other is connected same via a connection gear assembly; a pair of loading arms responsive to the loading gears to move a pair of loading blocks back and forth; and a pinch roller arm connected to one of the transmission gear assembly, loading gears and connection gear assembly to move a pinch roller back and forth.

12 Claims, 4 Drawing Sheets

TAPE LOADING MECHANISM IN MAGNETIC RECORDING AND REPRODUCING APPARATUS

This application is a continuation of U.S. Ser. No. 07/058 458, filed June 5, 1987 now abandoned.

FIELD OF THE INVENTION

This invention relates to a mechanism for driving loading blocks and a pinch roller in a magnetic recording and reproducing apparatus such as digital audio tape recorder (DAT) including a rotary head, and more particularly to an improvement of placement and arrangement of loading gears for scale reduction of the mechanism.

BACKGROUND OF THE INVENTION

Together with recent progress in the digital audio technology, associated technologies for converting analog audio signals into digital signals and recording them on a tape are developed. Since a significantly wide exclusive frequency band is required to convert analog signals into digital signals, a magnetic head for signal recording or reproduction on a tape must have a wide contact area per unit time. In this respect, it is indispensable to replace a conventional fixed-head arrangement by a rotary head arrangement. Therefore, various tape recorders including a rotary head have been proposed to meet the requirement.

Such a tape recorder or other magnetic recording apparatus including a rotary head requires a loading mechanism which moves right and left loaing blocks back and forth to wind the tape on the rotary head. The tape loading mechanism is configured to rotate right and left loading gears with the energy of a loading motor and move the right and left loading blocks back and forth in response to motions of loading arms effected by rotations of the loading gears. Positional relationships between respective members in th tape loading mechanism are such that the right and left loading gears directly engage each other, and respective loading blocks are located at opposite outer positions of the loading gears.

However, if the loading arms are located at opposite outer positions of the gears, they require large moving spaces, respectively, and often hit or contact reel bases during back and forth movements of the loading blocks. If the loading arms are mounted in a crossing fashion, they require moving spaces above the reel bases, and this invites an increase in height of the mechanism. Thus both arrangements cause a dimensional increase of the mechanism.

On the other hand, simultaneously with back and forth movements of the loading blocks effected by the loading arms, a pinch roller arm has to be driven to move a pinch roller back and forth. If the tape loading mechanism is used to drive the pinch roller arm, it is necessary to regulate relative motion timings between the pinch roller and the loading blocks, i.e. between the pinch roller arm and the loading arm. In this respect, a prior art mechanism includes a timing regulating arrangement using a transmission means which establishes engagement between a cam groove provided in a drive gear connected to a loading motor and a cam plate connected to the loading gears. However, this invites a complicated transmission arrangement and increases the scale of the mechanism.

Such a dimensional increase of the mechanism is against a strong demand of scale reduction of a tape recorder particularly for use in a car.

OBJECT OF THE INVENTION

It is therefore an object of the invention to overcome the above-indicated problems in the prior art mechanism, such as interferences between members in the tape loading mechanism, complicated positional relationship and construction of the tape loading mechanism and the pinch roller movable therewith, and increase of the space occupied by these members.

For this purpose, the invention provides a tape loading mechanism in a magnetic recording and reproducing apparatus including a rotary head which mechanism drives the loading blocks and the pinch roller, never causing any interference between them, simplifies positional relationships between the members and decreases the movement spaces of the members.

SUMMARY OF THE INVENTION

The tape loading mechanism for use in a magnetic recording and reproducing apparatus has a basic feature that right and left loading gears are connected by a connection gear, a gearing is used for power transmission from a loading motor to one of the loading gears, and a pinch roller arm is linked to one of these gears.

With this arrangement, the loading block and the pinch roller can be driven simultaneously. Further since right and left loading arms can move in a free space in front of the rotary head from a position overlapping the loading gears, the effective use of the space contributes to a scale reduction of the mechanism, and never causes interference between movable members. Additionally, the use of gears for power transmission simplifies the construction and reduces the required space.

DETAILED DESCRIPTION

The invention mechanism is described below in detail, referring to a preferred embodiment illustrated in the drawings.

Figure 1:
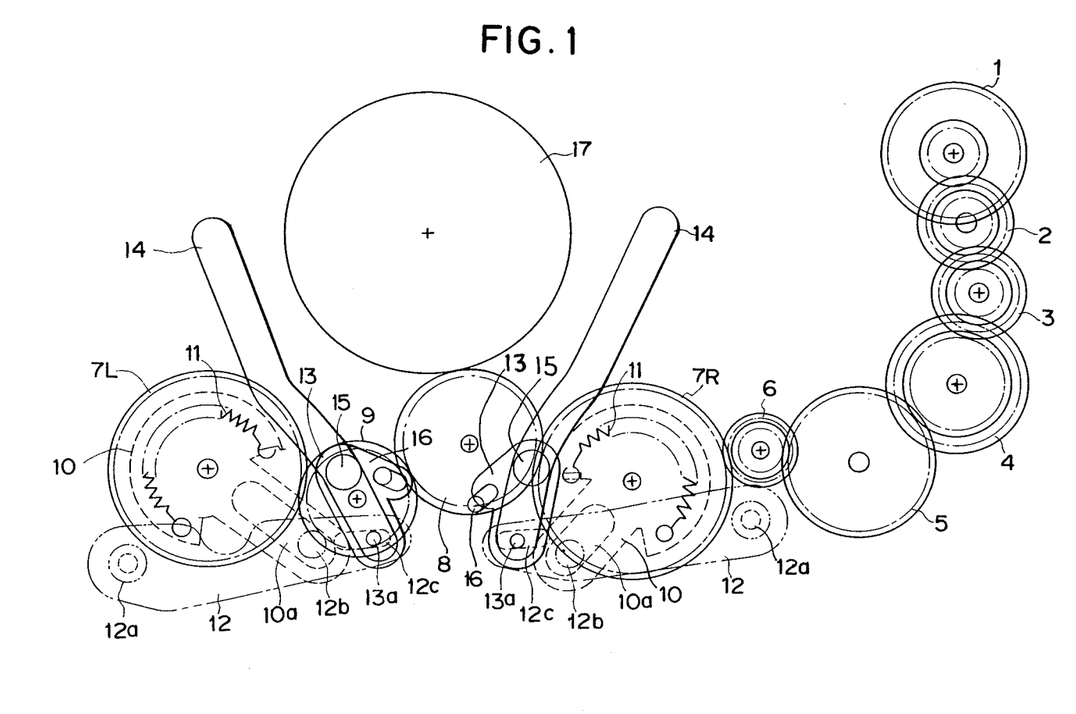
FIG. 1 is a diagrammatic plan view of a tape loading mechanism for a magnetic recording and reproducing apparatus which embodies the invention.

Referring to FIG. 1, a right-hand loading gear 7R is connected via five transmission gears 2 to 6 to a drive gear 1 which in turn is linked to a loading motor (not shown). The right-hand loading gear 7R is also linked to a left-hand loading gear 7L via two connection gears 8 and 9. In this gearing system, the right-hand loading gear 7R rotates in the same direction as the driving gear 1 whereas the left-hand loading gear 7L rotates in the opposite direction.

The right and left loading gears 7R and 7L coaxially support respective ends of loading arm driving members 10, respectively. Each loading arm driving member 10 is biased in the rotating direction of associated loading gear 7R or 7L by a spring 11 connecting it to the loading gear. Unless any external force is applied, the loading arm driving members 10 rotate integrally with the loading gears 7R and 7L. Each loading arm driving member 10 has an engage hole 10a engaging an engage pin 12b of a loading arm 12 so as to pivot the loading arm 12 back and forth about its shaft 12a when the loading arm driving member 10 rotates together with the loading gear 7R or 7L, so that a loading block 13 having an engage pin 13a in engagement with an engage hole 12c at a distal end of the loading arm 12 moves back and forth along a guide groove 14. Each loading block 13 moves ahead in a loading operation and pushes the tape ahead by means of vertical posts 15 and angled posts 36 to put the tape in contact with a rotary head over 90 degrees.

Figure 2:
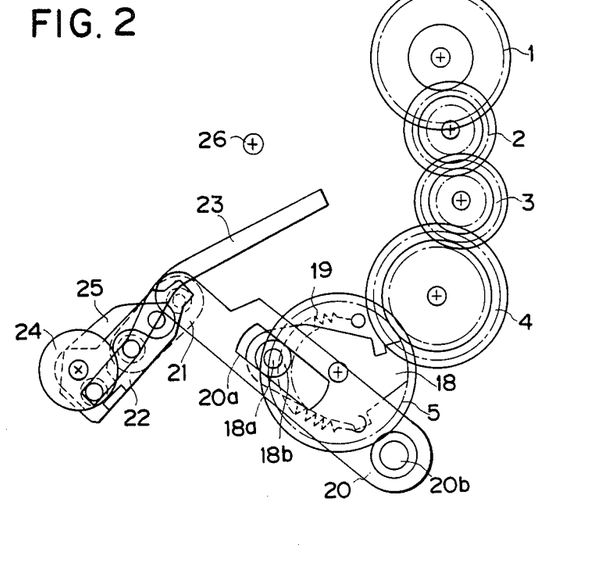
FIG. 2 is a diagrammatic plan view of a pinch roller control arrangement of the magnetic recording and reproducing apparatus.

Referring to FIG. 2, one end of a pinch roller arm driving member 18 is coaxially mounted on the forth transmission gear 5. The pinch roller arm driving member 18 is biased in the rotating direction of the fourth transmission gear 5 by a spring 19 interposed between the fourth transmission gear 5 and itself and rotates integrally with the fourth transmission gear 5 unless any external force is applied. The pinch roller arm driving member 18 has an engage pin 18a formed at a distal end thereof for engagement with an engage hole 20a of a pinch roller arm 20 so as to pivot the pinch roller arm 20 back and forth about its shaft 20b when the pinch roller arm driving member 18 rotates together with thr fourth transmission gear 5, and to cause a pinch roller block 22 in engagement with a distal end of the pinch roller arm 20 via a pinch roller link 21 to move back and forth along a guide groove 23. On end of the pinch roller block 22 pivotably supports a pinch roller close contact arm 25 supporting a pinch roller 24 at a distal end thereof. Reference numeral 26 designates a capstan shaft.

Figure 3:
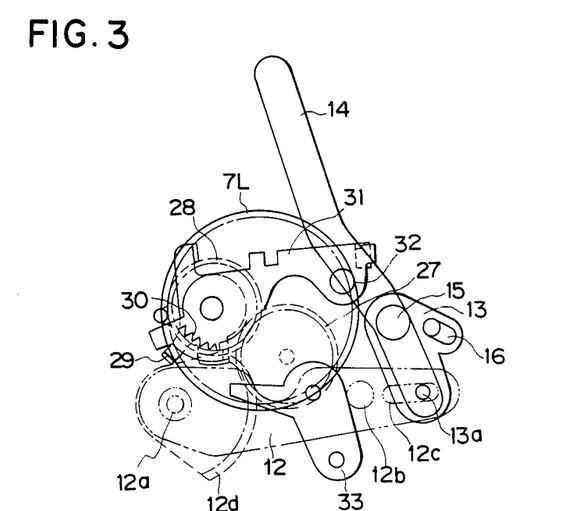
FIG. 3 is a diagrammatic plan view of a tension arm control arrangement of the magnetic and reproducing apparatus.

Referring to FIG. 3, the left-hand loading arm 12 is provided with a gear portion 12d and connected to a tension arm pull-out gear 28 via a connection gear 27. The tension arm pull-out gear 28 coaxially supports a tension arm 31 via a tension link 29 and a spring 30. With this linkage, the tension arm 31 pivots back and forth in response to a pivotal movement of the left-hand loading arm 12. The tension arm 31 has at its distal end a tension post 32 for servo control of the tape tension in the play mode. Reference numeral 33 denotes a tension servo starting member which locks the tension link 29 in the play mode and releases the biasing energy of a spring 30 to activate tension servo control by the tension arm 31.

With this arrangement, the invention mechanism operates as follows.

Tape Loading Mode

In the tape loading mode of the tape player, the loading motor begins its rotation upon completion of a cassette loading motion effected by cassette insertion. Concurrently, the drive gear 1 rotates clockwise from the position of FIG. 1.

Responsively, the right-hand loading gear 7R is rotated clockwise by five transmission gears 2 through 6 whereas the left-hand loading gear 7L is rotated counterclockwise by two connection gears 8 and 9. Respective rotations of the loading gears 7R and 7L cause rotation of the loading arm driving members 10 to pivot the loading arms 12 about their shafts 12a. As a result, the loading block engaging the distal end of each loading arm 12 moves ahead along the guide groove 14.

On the other hand, since the fourth transmission gear 5 rotates clockwise, the pinch roller arm driving member 18 also rotates integrally, and the pinch roller arm 20 pivots forward about its shaft 20b. As a result, the pinch roller block 22 advances along the guide groove 23 via the pinch roller link 21. Therefore, the pinch roller 24 mounted on the pinch roller block 22 moves ahead.

As the left-hand loading arm 12 pivots ahead in response to rotation of the left-hand loading gear 7L, the tension arm 31 connected thereto is pivoted ahead.

Finally, as shown in FIGS. 2 through 6, the loading blocks 13 and the pinch roller block 22 are immoved at their predetermined positions, and when the tape contacts the rotary head 17, the drive gear 1 stops after a slight rotation. Responsively, the transmission gears 2 through 6, loading gears 7R and 7L and connection gears 8 and 9 also stop, respectively. The tension arm 31 is also held at a predetermined forward position.

Figure 4:
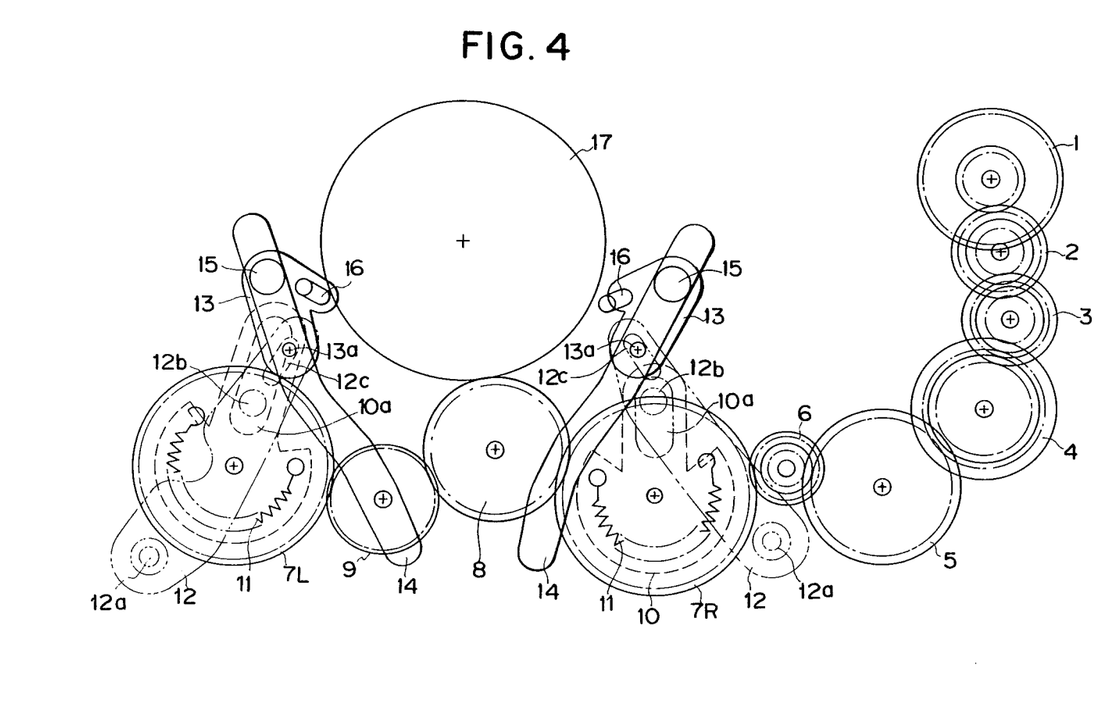
FIG. 4 is a view similar to FIG. 1 but showing a different operational position of the tape loading mechanism.
Figure 5:
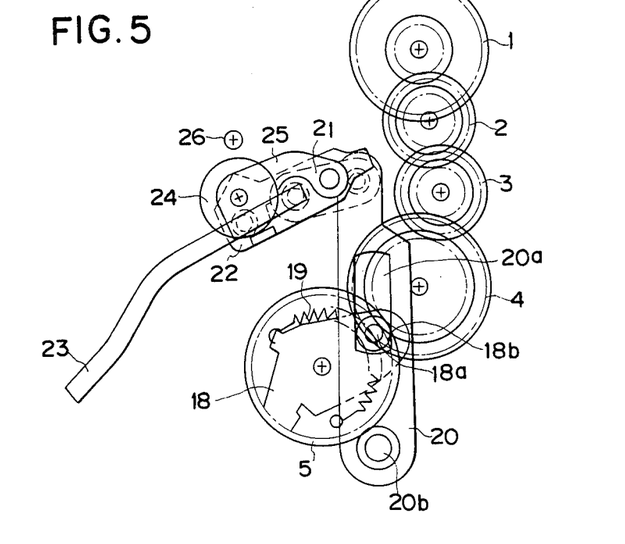
FIG. 5 is a view similar to FIG. 2 but showing a different operational position of the pinch roller control arrangement.
Figure 6:
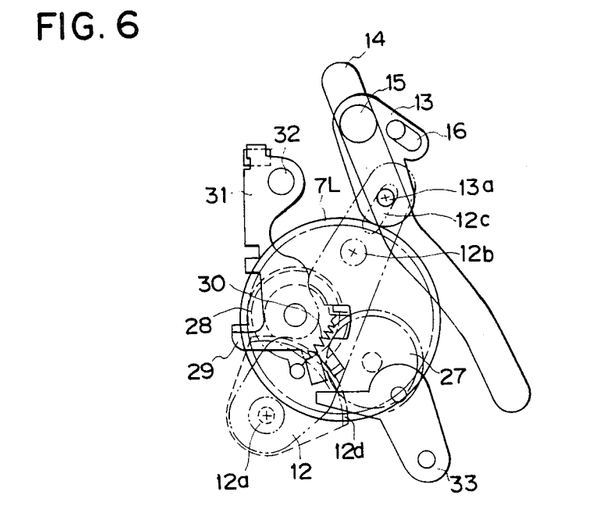
FIG. 6 is a view similar to FIG. 3 but showing a different operational position of the tension arm control arrangement.

Ejection Mode;

In the ejection mode of the tape player, the loading motor is rotated in the opposite direction from the stop mode of Figure 4, and respective gears also rotate in the opposite directions with respect to those in the aforegoing loading mode. Responsively, the loading blocks 13 and the pinch roller block 22 retreat, respectively, and the tension arm 31 is pivoted backward. Finally, these members take positions shown in FIGS. 1 through 3, and as a result, the cassette loading motor is enerized to perform a cassette ejecting operation.

As described, the invention employs a simple construction using a series of gears to effect back and forth movements of the loading blocks 13 and the pinch roller block 22 (together with the pinch roller 24). Particularly, since the right and left loading gears 7R and 7L are connected by the connection gears 8 and 9, the loading arms 12 can move in a free space present in front of the rotary head from their positions overlapping the loading gears 7R and 7L, respectively, never inviting any interference between the members which often occurs in the prior art mechanism, and hence contributing scale reduction of the mechanism. Further, since the power transmission from the drive gear to the loading gears 7R and 7L is done exclusively by the gears, the arrangement enables any suitable placement of members based on three-dimensional use of the space which also contributes to scale reduction of the mechanism.

Further, the invention employs a simple arrangement using the loading arm driving members 10 and the loading arms 12 to perform back and forth movement of the loading blocks 13. Beside this, by not only connecting the right and left loading gears 7R and 7L via the connection gears 8 and 9 but also engaging the loading arms 12 with elongated holes 10a of the loading arm driving members, significantly flexible motions are established. Therefore, movement areas of both members may be overlapped. This contributes to a significant space reduction for motions in the entire mechanism because no distance is required between each loading gear 7R (7L)

and the guide groove 14 of each loading block 13, for example (they partly overlap in the drawings).

Additionally, since the movement areas of the loading arms 12 and the loading arm driving members 10 are within the free space extending from the positions overlapping the loading gears 7R and 7L to the front end of the rotary head, the members never hit nor contact the reel bases.

The invention is not limited to the illustrated embodiment. For example, the loading arms, pinch roller arm, loading arm driving members and other related members may have any other appropriate configurations. The loading arms may be provided with an elongated hole for engagement with engage portions provided on the loading arm driving members. Similar modification may be used for linkage between the loading arms and the loading blocks. Further, connection between the loading arms and the loading blocks may be effected by appropriate means other than the elongated hole. Additionally, linking arrangements between the tape loading mechanism and the pinch roller arm or tension arm may be selected as desired.

The invention has the following advantageous results.

The connected arrangement of the right and left loading gears using the connection gears as well as the use of gears for power transmission from the loading motor permits three-dimensional, effective use of the interior space, never inviting any interference between respective members, and hence leads to simplification and scale reduction of the mechanism.

Further, the connected arrangement of the right and left loading gears using the connection gears as well as the connecting arrangement between the loading gears and the loading blocks using the loading arm driving members and their elongated holes provides more flexibility in motions of members and make it possible to overlap respective movement areas of different members as far as possible. Therefore, the invention arrangement never invites any interference between different movable members and enables an efficient use of the interior space and a significant scale reduction of the mechanism.

What is claimed is:

1. A tape reproducing apparatus, comprising: a rotating head; a loading block and means supporting said loading block in the region of said head for reciprocal movement relative to said head along a path of travel between first and second positions; a loading arm supported for pivotal movement between first and second positions about a stationary first axis which is spaced from said path of travel and which is on a side of said path of travel remote from said head; means coopeable with said loading arm at a location thereon spaced from said first axis for effecting movement of said loading block between it first and second positions in repsonse to movement of said loading arm between its first and second positions, respectively; a gear supported for rotation about a stationary second axis located between said first axis and said path of travel; means for selectively effecting rototation of said gear; and means cooperable with said gear and a portion of said loading arm for effecting movement of said loading arm between said first and second positions thereof in response to rotational movement of said gear.

2. An apparatus of claim 1, wherein said means for effecting movement of said loading block in response to movement of said loading arm includes an elongate hole provided in one of said loading block and said loading arm and a pin which is provided on the other thereof and which is slidably received in said elongate hole.

3. An apparatus of claim 2, wherein said elongate hole is provided in said loading arm and extends approximately radially of said first axis, said pin bering provided on said loading block.

4. An apparatus of claim 2, wherein said means for effecting movement of said loading arm in response to rotational movement of said gear includes a driving member supported for rotation about said second axis, resilient means operatively coupling said driving member and said gear for yieldably resisting rotational movement of said driving member relative to said gear, an elongate opening provided in one of said driving member and said loading arm, and a pin provided on the other thereof and slidably engaging said elongate opening.

5. An apparatus of claim 4, wehrein said opening is provided in said driving member and extends substantailly radially of said second axis, said loading arm having thereon said pin which slidably engages said elongate opening in said driving member.

6. An apparatus of claim 5, wherein said resilient means includes a helical expansion spring having its ends respectively coupled to said driving member and said gear.

7. A tape loading mechanism in a magnetic recording and reproducing apparatus having a rotary head, comprising:
means defining a pair of elongate guide grooves located on opposite sides of said rotary head;
two loading blocks which are each movably supported in a respective said guide groove;
a rotatable drive gear driven by a loading motor;
a pair of rotatable loading gears each provided near a respective one of said guide grooves;
a transmission gear mechanism which drivingly couples said drive gear to one of said loading gears;
a connection gear mechanism which drivingly couples said one of said loading gears to the other thereof;
a pair of loading arms each having one end supported for pivotal movement about a respective pivot axis located on a side of a respective said loading gear remote from the associated guide groove and having the other end coupled to a respective one of said loading blocks which are each movable along a respective one of said guide grooves; and
means responsive to rotation of said loading gears for effecting pivotal movement of said loading arms;
wherein each said loading block has an engage pin, and the associated loading arm has at a location spaced radially from its pivot axis an elongate hole which slidably receives said engage pin; and
wherein said means for effecting pivotal movement of each said loading arm is operatively coupled to the loading arm at a location between said pivot axis and said elongate hole of the loading arm.

8. A tape loading mechanism of claim 7, wherein said means for effecting pivotal movement of said loading arms includes a pair of loading arm driving members each coaxially pivotally supported with respect to a respective one of said loading gears; a pair of springs which are each coupled to a respective one of said loading arm driving members and to the associated loading gear; and a pair of engage pins each provided on a respective one of said loading arms at a location between said pivot axis and said elongate hole thereof, and each engaging an elongate engage hole provided in a respective one of said loading arm driving members.

9. A tape loading mechanism in a magnetic recording and reproducing apparatus having a rotary head, comprising:
  means defining a pair of elongate guide grooves located on opposite sides of said rotary head;
  two loading blocks which are each movably supported in a respective said guide groove;
  a rotatable drive gear driven by a loading motor;
  a pair of rotatable loading gears each provided near a respective one of said guide grooves;
  transmission gear means for effecting rotation of one of said loading gears in response to rotation of said drive gear;
  connection gear means responsive to rotation of said one of said loading gears for effecting rotation of the other thereof;
  a pair of loading arms each having one end supported for pivotal movement about a respective axis located on a side of a respectively said loading gear remote from the associated guide groove and having the other end coupled to a respective one of said loading block which are each movable along a respective one of said guide grooves; and
  means responsive to rotation of said loading gears for effecting pivotal movement of said loading arms;
  wherein said means for effecting pivotal movement of said loading arms includes a pair of loading arm driving members each movably supported adjacent a respective one of said loading gears; a pair of springs which are each coupled to a respective one of said loading arm driving members and to the adjacent loading gear; and a pair of engage pins each provided on a respective one of said loading arms and each engaging an engage hole provided in a respective one of said loading arm driving members.

10. A tape loading mechanism in a magnetic recording an reproducing apparatus having a rotary head, comprising:
  means defining a pair of elongate guide grooves located on opposite sides of said rotary head;
  two loading blocks which are each movably supported in a respective said guide groove;
  a rotatable drive gear driven by a loading motor;
  a pair of rotatable loading gears each provided near a respective one of said guide grooves;
  transmission gear means for effecting rotation of one of said loading gears in response to rotation of said drive gear;
  connection gear means responsive to rotation of said one of said loading gears for effecting rotation of the other thereof;
  a pair of loading arms each having one end supported for pivotal movement about a respective axis located on a side of a respective said loading gear remote from the associated guide groove and having the other end coupled to a respective one of said loading blocks which are each movable along a respective one of said guide groove;
  means responsive to rotation of said loading gears for effecting pivotal movement of said loading arms;
  a rotatable capstan shaft;
  a rotatable pinch roller supported for movement toward and away from said capstan shaft;
  a movable pinch roller arm;
  means driven by said transmission gear means for effecting movement of said pinch roller arm; and
  means responsive to movement of said pinch roller arm for effecting movement of said pinch roller with respect to said capstan shaft;
  wherein said transmission gear means includes a rotatable transmission gear; and
  wherein said means for moving said pinch roller arm includes a pinch roller arm driving member supported on said transmission gear for movment therewith, and an engage pin formed on said pinch roller arm driving member and engaging an engage hole provided in said pinch roller arm.

11. A tape loading mechanism in a magnetic recording and reproducing apparatus having a rotary head, comprising:
  means defining a pair of elongate loading block guide grooves located on opposite sides of said rotary head;
  two loading blocks which are each movably supported in a respective said loading block guide groove and which each have thereon an engage pin;
  a rotatable drive gear driven by a loading motor;
  a pair of rotatable loading gears each provided near a respective one of said loading block guide grooves;
  a transmission gear mechanism which drivingly couples said drive gear to one of said loading gears in response to rotation of said drive gear, said transmission gear mechanism including a transmission gear which is rotated in response to rotation of said drive gear;
  a connection gear mechanism which drivingly couples said one of said loading gears to the other thereof;
  a pair of loading arms each having one end supported for pivotal movement about a respective pivot axis located on a side of a respective said loading gear remote from the associated guide groove and having at the other end an elongate hole which slidably receives the engage pin on a respective one of said loading blocks which are each movable along a respective one of said loading block guide grooves;
  means responsive to rotation of said loading gears and cooperable with each said loading arm at a location spaced radially from the pivot axis thereof for effecting pivotal movement of said loading arms;
  means defining an elongate pinch roller guide groove near said transmission gear;
  a pinch roller block movably supported in said pinch roller guide groove;
  a pinch roller arm which is supported at one end for pivotal movement about a pivot axis located on a side of said transmission gear remote from said pinch roller guide groove, and means operatively coupling an opposite end thereof to said pinch roller block for effecting movement of said pinch roller block in response to movement of said pinch roller arm;
  means response to rotation of said transmission gear and cooperable with said pinch roller arm at a location between said ends thereof for effecting pivotal movement of said pinch roller arm.

12. A tape loading mechanism of claim 11, wherein said means for effecting pivotal movement of said loading arms includes a pair of loading arm driving members each coaxially pivotally supported with respect to a respective one of said loading gears; a pair of springs which are each coupled to a respective one of said loading arm driving members and to the associated loading gear; and a pair of engage pins each provided on a respective one of said loading arms at a location between said pivot axis and said elongate hole thereof, and each engaging an elongate engage hole provided in a perspective one of said loading arm driving members.

* * * * *

UNITED STATES PATENT AND TRADEMARK OFFICE
CERTIFICATE OF CORRECTION

PATENT NO. : 4 872 075

DATED : October 3, 1989

INVENTOR(S) : Katsumi YAMAGUCHI et al

It is certified that error appears in the above-identified patent and that said Letters Patent is hereby corrected as shown below:

```
Column 5, line 53; change "coopeable" to ---cooperable---.
          line 56; change "it" to ---its---.
                   change "repsonse" to ---response---.
          line 68; change "Ioading" to ---loading---.
Column 6, line  7; change "bering" to ---being---.
          line 20; change "wehrein" to ---wherein---.
Column 7, line 23; change "respectively" to
                   ---respective---.
```

Signed and Sealed this

Twenty-eighth Day of May, 1991

Attest:

HARRY F. MANBECK, JR.

Attesting Officer

Commissioner of Patents and Trademarks